US006915009B2

(12) United States Patent
Foote et al.

(10) Patent No.: US 6,915,009 B2
(45) Date of Patent: Jul. 5, 2005

(54) SYSTEMS AND METHODS FOR THE AUTOMATIC SEGMENTATION AND CLUSTERING OF ORDERED INFORMATION

(75) Inventors: Jonathan T. Foote, Menlo Park, CA (US); Matthew Cooper, San Jose, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 727 days.

(21) Appl. No.: 09/947,385

(22) Filed: Sep. 7, 2001

(65) Prior Publication Data

US 2003/0048946 A1 Mar. 13, 2003

(51) Int. Cl.[7] .................................................. G06K 9/34
(52) U.S. Cl. ....................................... 382/173; 382/225
(58) Field of Search ................................ 382/173, 176, 382/181, 197, 224, 225, 229, 305; 707/1–10; 704/245

(56) References Cited

U.S. PATENT DOCUMENTS

| 5,579,401 | A |   | 11/1996 | Gear ........................... 382/100 |
|---|---|---|---|---|
| 5,799,268 | A | * | 8/1998 | Boguraev ....................... 704/9 |
| 5,872,865 | A | * | 2/1999 | Normile et al. .............. 382/224 |
| 6,137,911 | A | * | 10/2000 | Zhilyaev ...................... 382/225 |
| 6,246,982 | B1 | * | 6/2001 | Beigi et al. ................... 704/238 |
| 6,560,597 | B1 | * | 5/2003 | Dhillon et al. .................. 707/4 |
| 6,580,437 | B1 | * | 6/2003 | Liou et al. .................... 345/719 |

OTHER PUBLICATIONS

Gong, et al. "Video summarization using singular value decomposition", IEEE, pp. 1–7, Jun. 15, 2000.*
Landauer, et al. "An introduction to latent semantic analysis" pp. 1–41, 1998.*
Slaney, et al. "Temporal events in all dimensions and scales", IEEE, pp. 83–91, Mar. 2001.*
Misra "Order–recursive Gaussian elimination", IEEE, pp. 396–400, Jan. 1996.*
Gong, et al. "Video shot segmentation and classification", IEEE, pp. 860–863, Jun. 2000.*
Thomasian, et al. "Clustering and singular value decomposition for approximate indexing in high dimensional spaces", ACM, pp 201–207, 1998.*
Gong, et al. "Generating optimal video summaries", IEEE, pp. 1559–1562, Apr. 2000.*
Berry, et al. "Matrices, vector spaces, and information retrieval*", Society for industrial and applied mathematis, pp. 335–362, 1999.*
J. Costeira and T. Kanade. A Multibody Factorization Method for Motion Analysis. Proc ICCV, pp. 1071–1076, 1995. C. W. Gear. Multibody Grouping from Motioin Images. *Int. J. Computer Vision* 29(2): 133–150, 1998.
P. Perona and W. Freeman. A Factorization Approach to Grouping. *Proc. ECCV*, pp. 655–670, 1998. J. Shi and J. Malik. Normalized Cuts and Image Segmentation. *Proc. IEEE CVPR*, pp. 731–737, 1997.
Y. Weiss. Segmentation using eigenvectors: a unifying view. *Proc. IEEE Intl. Conf. On Computer Vision* pp. 375–982, 1999.

\* cited by examiner

*Primary Examiner*—Daniel Mariam
(74) *Attorney, Agent, or Firm*—Oliff & Berridge, PLC

(57) ABSTRACT

Techniques segmenting ordered information such as audio, video and text are provided by windowing and parameterizing an ordered information stream and storing of the parameterized and windowed information into a two-dimensional representation such as a matrix. The similarity between the parameter vectors is determined and an orthogonal matrix decomposition such as singular value decomposition is applied to the similarity matrix. The singular values or eigenvalues of the resulting decomposition indicate major components or segments of the ordered information. The boundaries of the major components may be determined using the determined singular vectors to provide, for example, smart cut-and-paste of ordered information in which boundaries are automatically identified by the singular vectors; automatic categorization and retrieval of ordered information and automatic summarization of ordered information.

24 Claims, 7 Drawing Sheets

$$S = \begin{bmatrix} 2 & 1 & 1 & 1 & 0 & 0 & 1 & 1 \\ 1 & 2 & 2 & 2 & 1 & 1 & 2 & 2 \\ 1 & 2 & 2 & 2 & 1 & 1 & 2 & 2 \\ 1 & 2 & 2 & 2 & 1 & 1 & 2 & 2 \\ 0 & 1 & 1 & 1 & 2 & 2 & 1 & 1 \\ 0 & 1 & 1 & 1 & 2 & 2 & 1 & 1 \\ 1 & 2 & 2 & 2 & 1 & 1 & 2 & 2 \\ 1 & 2 & 2 & 2 & 1 & 1 & 2 & 2 \end{bmatrix}$$

Fig. 5

SYSTEMS AND METHODS FOR THE AUTOMATIC SEGMENTATION AND CLUSTERING OF ORDERED INFORMATION

BACKGROUND OF THE INVENTION

1. Field of Invention

This invention relates to automatic segmentation and clustering of ordered information.

2. Description of Related Art

Conventional audio summarization techniques segment audio and then select a representative selection from each segment. A subset of these selections is used as a summary of the audio. However, these conventional systems require a great deal of time to produce a summary since the entire work must be reviewed to create candidate segments. Additional review is required to select representative segments selections for the summary. Finally, even when a representative segment is selected, the representative segment may be too lengthy to provide an appropriate summary.

In video summary generation, some conventional video summary generators have attempted to use scene transition graphs to perform ad-hoc segmentation. The ad-hoc segmentation is then followed by a hierarchical clustering process to create a summary. Other conventional video summary generators have used closed captions, acoustic silence and pitch to determine the segment boundaries and to identify candidate segments for use in generating summaries. These conventional systems depend on determining the presence of closed captions, acoustic silence and pitch within the work and do not work well when these features are difficult to detect or missing from the work. Moreover, these conventional systems merely select a representative segment and therefore are not able to generate summaries of overly long candidate segments.

SUMMARY OF THE INVENTION

The systems and methods according to this invention provide for automatic segmentation and clustering of ordered data. The systems and methods according to this invention also provide for automatic segmentation based on self-similarity.

Automatic summarization is useful in various environments. For example, automatic audio/video summarization is useful in audio/video classification and retrieval systems. A video work may be segmented and the major components of each segment determined and compared to a second similarly segmented video. Based on the granularity of the comparison, similar or substantially similar works may be identified by comparing the degree of similarity of the major components, determining the sequence and/or frequency of major component changes or by using any other means of determining similarity of the major components of the compared first and second works.

In various exemplary embodiments according to this invention, the major components of a first work and any number of other works may be determined. The major components occurring in a first portion of a first text and a first portion of a second text can be determined and visualizations of self similarity measures between works based on some feature such as tempo may be used to classify other similar works based on the same feature.

Automatic segmentation and clustering of text information may also include determining the major components of a text information stream. Major components of newspapers, books, email messages or any other text information may be determined. For example, individual news stories within a newspaper may be determined based on the determined major components of the various text features within the text information stream. By determining the boundaries of the news stories, further processing may focus on individually determined news stories. Further processing may include determining the subject of the determined news story, triggering different indexing mechanisms depending on subject or any other known or later developed processing. It will be apparent that the choice of news texts is merely illustrative. Individual chapters within a book, individual sections within a document, transcriptions of spoken text such as a news broadcast, a trial transcript or any other sub-sections of ordered text or other information may be determined and clustered according to the various embodiments of this invention.

Access to determined major components of a work are provided by audio and video indexing functions according to various embodiments of this invention. For example, a reviewer may advance a video work to a scene or may advance an audio work to a crescendo as automatically determined according to the systems and methods of this invention. In various other embodiments, the reviewer may advance to the most representative or most important scene or major component or may use any of the automatically determined major components as a summary of the work. In this way, review of the work is facilitated.

The start, end and intermediate action points of audio and/or video works may also be automatically selected based on the automatic segmentation and clustering of ordered information. An audio work may be aligned or morphed to conform determined major components of the audio work to corresponding determined major components of the video work. Similarly, the determined major components of the audio work may be used to determine corresponding major components of video animation to provide more realistic mouth movements in a video work with virtual actors. Thus user interaction within audio and/or video works such as interactive games and interactive films is facilitated by the various embodiments according to this invention.

The various exemplary embodiments according to this invention also provide for a virtual disc jockey. The virtual disc jockey may be used to determine tempo, beat or any other feature and automatically add music tracks having a similar tempo, beat, rhythm or any identifiable feature into a single work or "mix" containing the various tracks.

BRIEF DESCRIPTION OF THE DRAWINGS

FIG. 5 shows a similarity matrix according to a second exemplary embodiment of this invention;

DETAILED DESCRIPTION OF EXEMPLARY EMBODIMENTS

Figure 1:
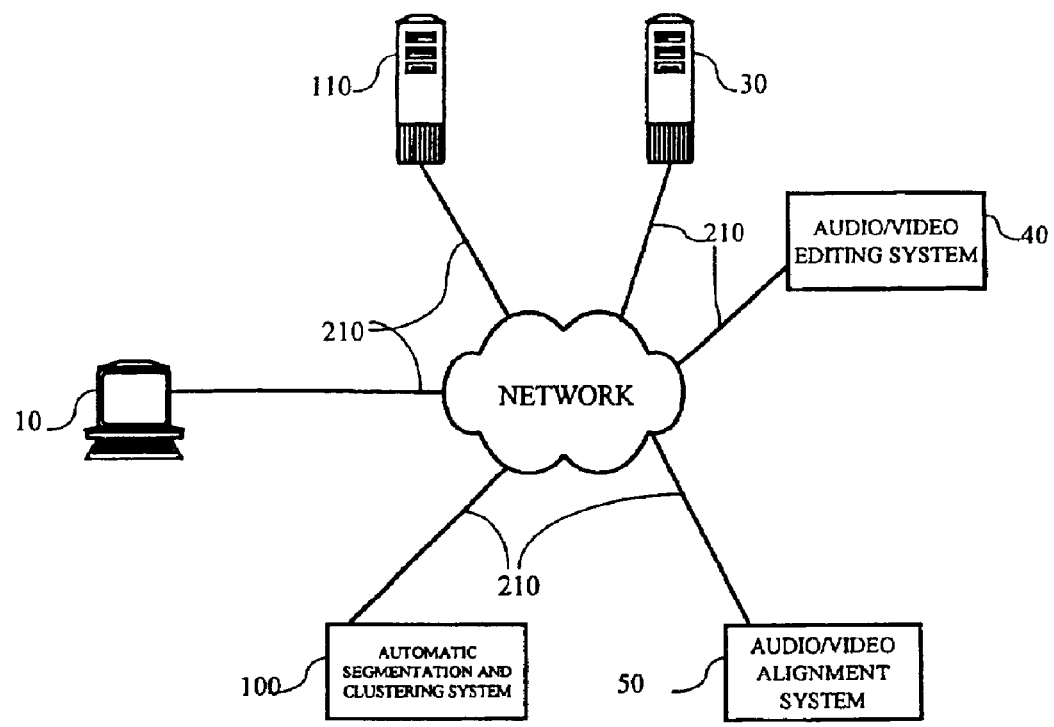
FIG. 1 shows an overview of an exemplary automatic segmentation and clustering system according to this invention.

FIG. 1 shows an overview including an exemplary automatic segmentation and clustering system 100 according to this invention. User device 10 is connected to web server 20, audio/video e-commerce server 30, video editing system 40, audio/video alignment system 50 and to the automatic segmentation and clustering system 100 via communication link 210.

A prospective internet video purchaser using device 10 reviews an audio and/or video work before deciding to purchase the work using the audio/video electronic commerce server 30. The audio/video electronic commerce server 30 retrieves the audio and/or video work and activates the automatic segmentation and clustering system 100 to generate a summary of the audio and/or video work. The automatic segmentation and clustering system 100 determines each of the major components in the video work and generates a summary based on samples of the determined major components. In order to avoid disclosing the surprise ending of an audio and/or video work, the determined summary may reflect only a percentage of the determined major components in the beginning and middle of the video work. Moreover, since the automatic segmentation and clustering system 100 may be used to determine boundaries of the major components, the length of each determined major component may be determined and only an appropriate portion of the total length included in the summary. It will be apparent that in various embodiments of this invention, the automatic segmentation and clustering of an audio/video work may determine the audio components, the video components and/or the combined audio and video components.

A user of video editing system 40 may also use the automatic segmentation and clustering system 100 to provide smart cut/paste functions and other enhanced editing capabilities based on the automatic determination of major component boundaries. For example, a user of the video editing system 40 retrieves a video work. The video work is then transferred to the automatic segmentation and clustering system 100 over communication link 210 where the major components of the video work are determined.

The determined major components of the video work are then forwarded back to the video editing system 40 and used to determine the boundaries of the major video components or segments. The determined major component or segment boundaries are then be used provide smart cut and paste operations and/or other enhanced video operations for determined major components within the video work. The time and expertise required to accomplish the editing of the video work are reduced since important components such as major scenes of the video work are automatically determined. It will be apparent that in various alternative embodiments according to this invention, automatic segmentation and clustering system 100 may be located in the video editing system 40 and/or any location accessible by the communication link 210. In various other embodiments, major components of audio, text or any other ordered information may be similarly determined.

A user of access device 10 may start an interactive game or interactive video available at web server 20. The audio/video information relating to the game or interactive film may then be forwarded over communication link 210 to the automatic segmentation and clustering system 100 via the audio/video alignment system 50. The audio/video alignment system 50 determines the user's current video scene, position and/or current action event in the interactive game or interactive film and aligns or matches the audio appropriate to the current video scene, position or action event based on the major components and major component boundaries determined by the automatic segmentation and clustering system 100. The aligned audio/video information is then forwarded over communications link 210 to the user device 10 for display to the user.

In various embodiments according to this invention, the audio/video information may be encoded into a streaming audio/video protocol such as MPEG-3, MPEG-4, the PNM-RealNetworks protocol, the RealVideo protocols from RealNetworks, the Microsoft Media Streaming Protocol in the Windows Media® Player from Microsoft Corporation or any other known or later developed audio and/or video protocol. The various embodiments according to this invention also provide for operating upon MPEG-4 or any other encoded information to directly access the windowing and parameterizations encoded within the encoded information stream or protocol without requiring separate decoding and encoding.

Figure 2:
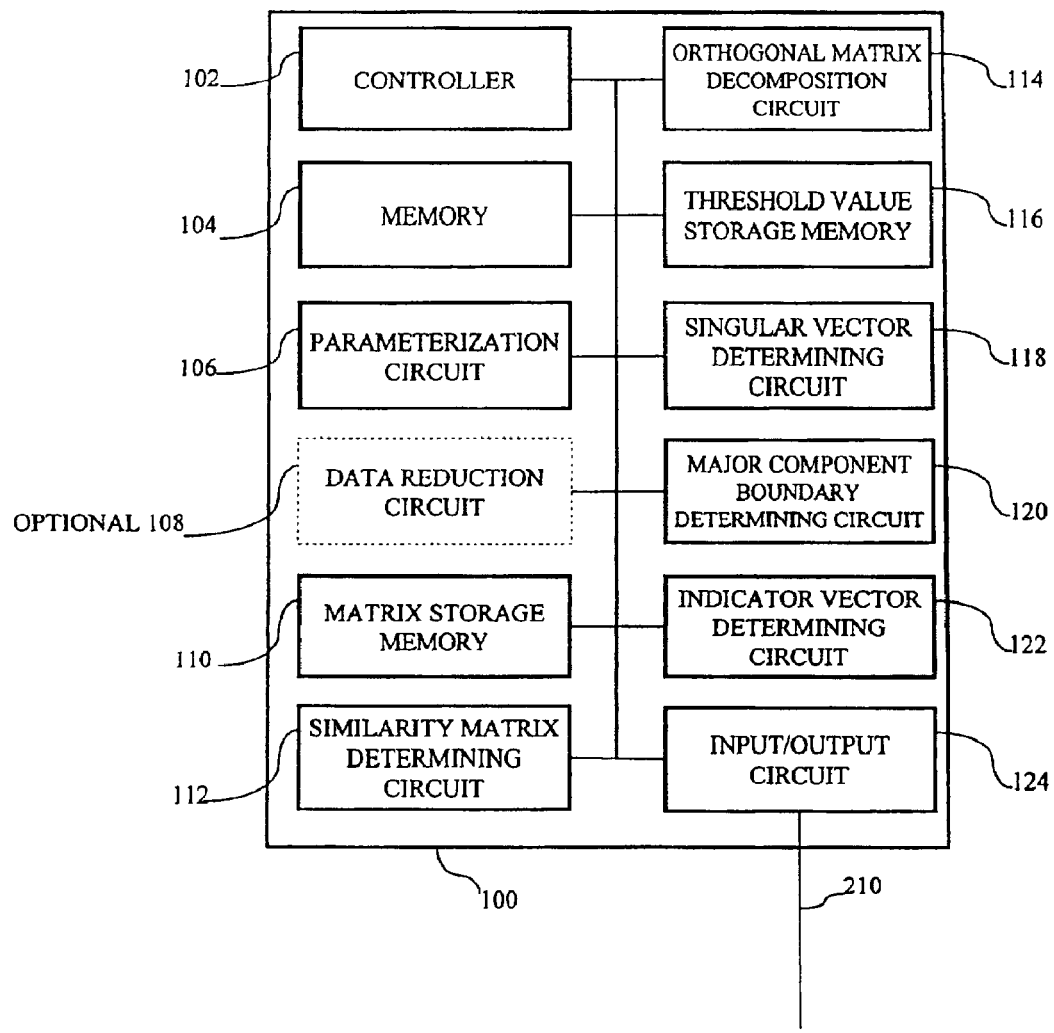
FIG. 2 shows an exemplary automatic segmentation and clustering system according to this invention.

FIG. 2 shows an exemplary automatic segmentation and clustering system 100 according to this invention. A controller 102; memory 104; parameterization circuit 106; data reduction circuit 108; matrix storage memory 110; similarity matrix determination circuit 112; orthogonal matrix decomposition circuit 114; a singular vector determining circuit 118 and major component boundary determining circuit 122 are connected through input/output circuit 124 to communication link 210.

The controller activates the input/output circuit 124 to retrieve and/or receive ordered information over communication link 210. The ordered information may include audio, video, text or any other information having an ordering dimension such as time for audio and/or video information and position for text information.

The retrieved and/or received information is stored in memory 104. The parameterization circuit 106 is then activated to determine the appropriate type of parameterization to be applied to the received and/or retrieved information. For example, different windowing and parameterization may be applied to audio information, video information, textual information or other types of ordered information.

In a first exemplary embodiment according to this invention, audio information such as the audio waveform is windowed into frames or the frames associated with the video information accompanying the audio information in the work are used as windows.

A parameterization of the windowed audio information is then determined. The windowed audio information may be parameterized using a Short Time Frame Fourier Transform (STFT), a Fourier Transform, a Mel-Frequency Cepstral Coefficients analysis, a spectrogram, a Fast Fourier Transform (FFT), wavelet decomposition or any other known or later developed analysis technique without departing from the spirit and scope of this invention.

Similarly, other ordered information such as video and text information may also be windowed. For example, the video information may be windowed by, selecting individual frames of video information and/or selecting groups of frames which are averaged together to determine an average value. Text information may be windowed by selecting words, sentences, paragraphs, an arbitrary number of words, by selecting words based on attributes such as parts of speech, meta-data, XML and/or HTML encoding, importance, term frequency and or inverse document frequency or any other known or later developed technique for windowing the text.

A parameterization of the windowed other ordered information is then determined. For example, parameterizing the video information may include use of color histograms, as disclosed in Zhang et al, "Video Parsing, Retrieval and Browsing: an Integrated and Content-Based Solution" in Intelligent Multimedia Information Retrieval, AAA Press, MIT Pres, 1997 incorporated herein by reference in its entirety. Alternatively, parameterized decimated video information may be derived from DC coefficients of compression macroblocks, Discrete Cosine Transforms may be applied to the video information or any other known or later developed method of parameterization of the ordered information may be used.

The optional data reduction circuit 108 is optionally activated to reduce the memory storage requirements of the parameterized information. For example, the storage requirements may be reduced by any of the methods discussed in Girgensohn et al. "Video Classification Using Transform Coefficients" in Proc ICASSP '99 Vol. 6 p. 3045–3048, Phoenix, Ariz., IEEE, 1999 incorporated herein by reference in its entirety. Alternatively, truncation, principal component analysis, ordered discriminant analysis or any other known or later developed method of data reduction may be used, either alone or in combination to create an optional reduced representation of the parameterized information that preserves salient information about the original windows or frames. For example, the reduced representation of the parameterized audio/video information reflects a compact feature vector of reduced coefficients for each audio and/or video frame. Since the reduced representation is used for analysis rather than reproduction of the original ordered information, the reduced representation does not need to be able to recover the original information but is used to indicate major components. Thus, the reduced representation may be further reduced.

The value of each element $D(i,j)$ is assigned a determined color information value based on comparison to a maximum feature value such as a maximum brightness. Each of the elements $D(i,j)$, $i=j$ having high self similarity have corresponding higher brightness values and appear along the diagonal. Repeated sections are indicated by areas of high brightness appearing off the diagonal. Diagonal stripes and/or checkerboard patterns of high brightness values reflect a repetition of the parameterized information. The similarity values for each element $D(i,j)$ are determined by the similarity matrix determining circuit 112 and stored in the matrix storage memory 110.

The similarity matrix determining circuit 112 may determine similarity based on the Euclidean distance between the parameterized information vectors as shown in equation 1.

$$D_E(i,j) = \|\sigma_i - \sigma_j\| \qquad (1)$$

Similarity in various other exemplary embodiments may be determined based on the dot product of the parameterized information vectors comprising the similarity matrix. For example, the dot product of two large similarity vectors will in turn be large as shown by equation 2.

$$D_d(i,j) = u_i \cdot \sigma_j \qquad (2)$$

The similarity may be determined using the cosine angle between parameterized information vectors, functions of vector statistics such as the Kullback-Leibler distance or any other known or later developed method of determining similarity of information vectors without departing from the spirit or scope of this invention. A distance measure or metric is incorporated into the similarity matrix such that the elements $D(i,j)$ on the diagonal represents the similarity of each element to itself. Thus, self similarity is at a maximum on the diagonal.

The orthogonal matrix decomposition circuit 114 is then activated to diagonalize the similarity matrix stored in matrix storage memory 110. The orthogonal matrix decomposition is described using a singular value decomposition type of orthogonal matrix decomposition. However, it will be apparent that eigenvector analysis, Gaussian elimination, Gram-Schmidt or any other known or later developed matrix decomposition technique may be used without departing from the spirit or scope of this invention.

For example, the m×n matrix A given by 3.

$$A = U\Sigma V^t \qquad (3)$$

where U is an m×m matrix with orthogonal columns and V is an n×n matrix with columns. The columns of U are the eigenvector s of $AA^T$, the columns of V are the eigenvector s of $A^tA$ and $\Sigma$ is a diagonal matrix. The diagonal elements of $\Sigma$ are the singular values of A. For positive definite matrixes, the factorization is equivalent to the eigenvalue/eigenvector decomposition of A.

The ability to use singular value decomposition techniques is useful since singular value decomposition may be applied to rectangular matrices. In particular, the use of rectangular matrices allows the combination of separately determined matrices such as audio and video matrices in the various embodiments according to this invention.

The effective rank may be computed by determining the number of singular values exceeding the threshold value retrieved from the threshold value storage memory 116.

$$\text{For } A = U\Sigma V^t \qquad (5)$$

with columns of U given by $u_i$ and columns of V by $v_i$ and $$\sigma_1 \geq \sigma_2 \geq \ldots \geq \sigma_n \qquad (6)$$

then $$A_K = \sum_{i=1}^{K} u_i \sigma_i v_i^t \qquad (7)$$

using Frobenius matrix normalization gives:

$$\text{ArgMin}_{rank\ (B)=K} \|A - B\|^2 = A_K \qquad (8)$$

The singular vector determining circuit 118 is activated to determine the singular vectors in the matrix A.

The rank reduced approximations show the essential block structure of A. However, the determined dominant singular vectors that are determined are an efficient summary of structural content of the similarity matrix in a compressed form.

The major component boundary determining circuit 120 is then activated to determine the boundaries between each of the determined major components based on the singular vectors. For example, the number of singular values exceeding a threshold correspond to the major components. The locations or positions of the major components in the ordered information may be determined from the singular vectors associated with each singular value exceeding a threshold.

The indicator determining circuit 122 is activated to determine transition or indicator vectors based on the singular vectors. The transition indicator vectors may be used to indicate changes in the determined major components. For example, if a first singular vector is at a maximum, the corresponding indicator vector reflects a maximum value such as one. Similarly, when the first singular vector is at a minimum, the corresponding indicator vector reflects a minimum value such as zero. The transition of the indicator vectors between values correspond to the determined major component boundaries.

In various exemplary embodiments, the parameterized information associated with a determined major component boundary may be used as an intuitive visual indicator. For example, in the audio/video editing system 40, an intuitive visual indicator such as an information image corresponding to a determined scene or major component, as indicated by an indicator vector transition, is displayed directly in a scrollbar. A user understands the intuitive visual indicator corresponds to a major component of the information stream and may immediately select the portion of the information stream by selecting the intuitive visual indicator or displayed parameterized information image.

Figure 3A:
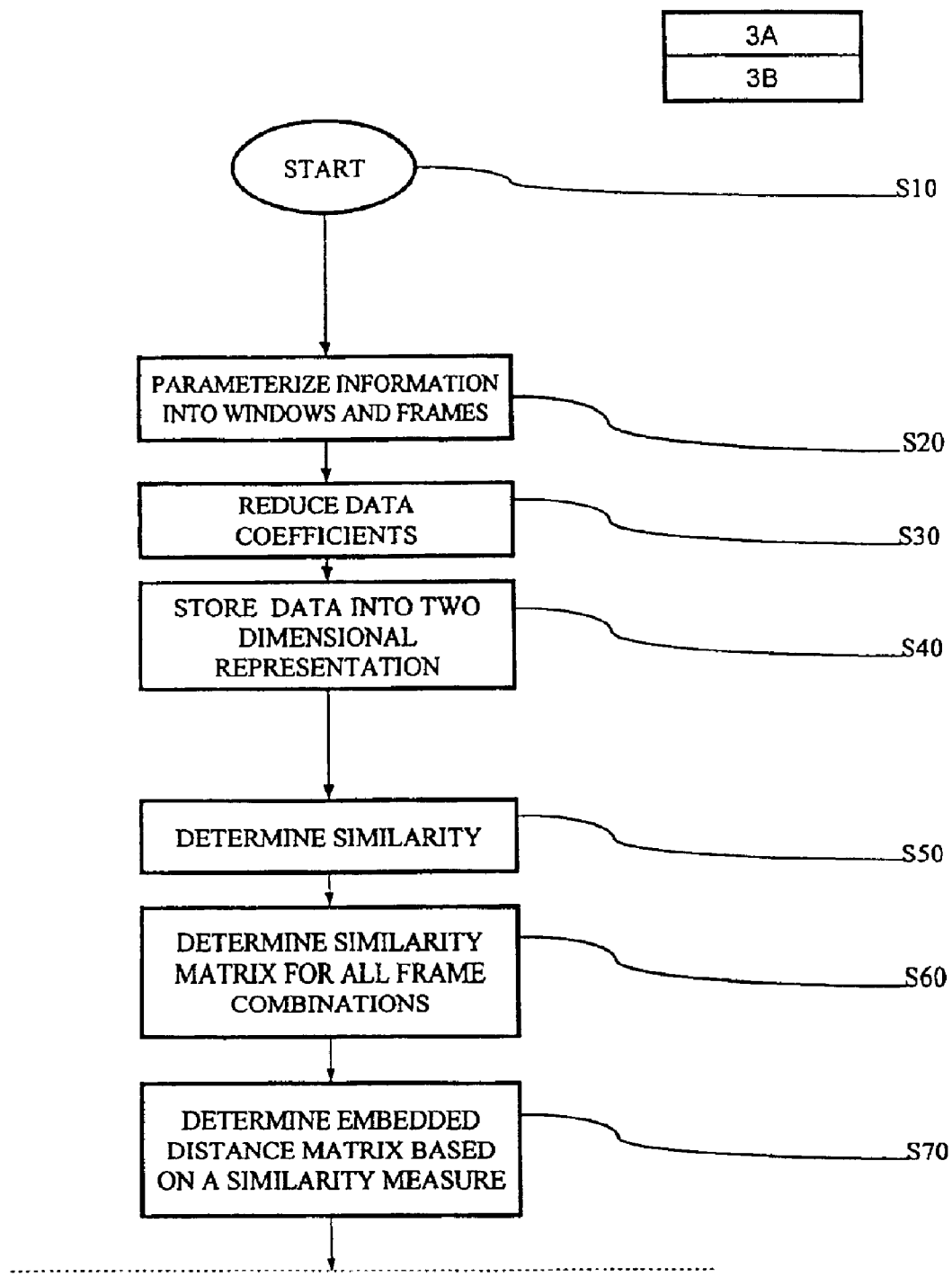
FIGS. 3A–3B is a flowchart of an exemplary method of automatic segmentation and clustering according to this invention.
Figure 3B:
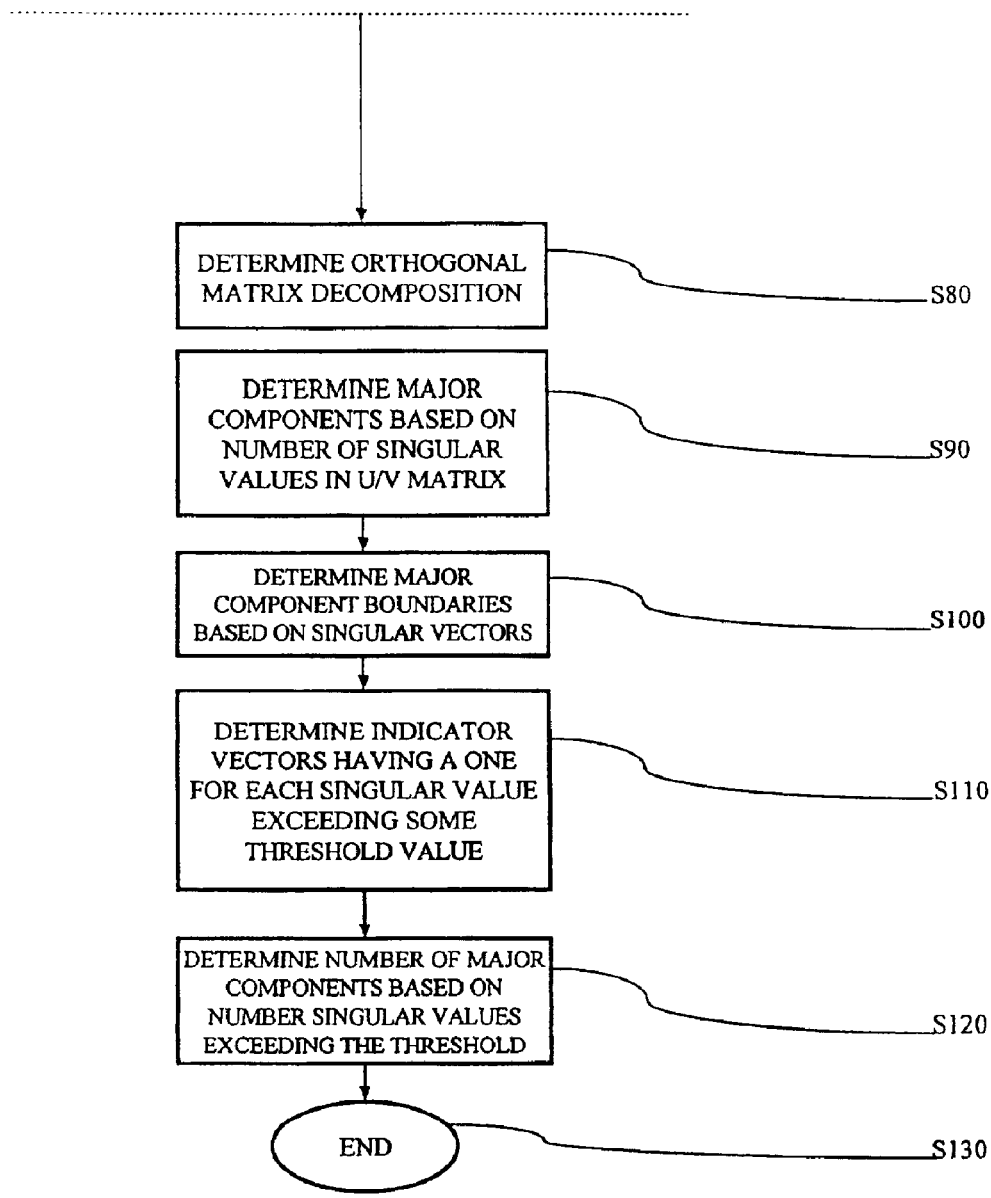

FIGS. 3A–B is a flowchart of an exemplary method of automatic segmentation and clustering according to this invention. The process begins at step S10 and immediately continues to step S20.

In step S20, the information is parameterized into windows or frames based on the type of information. For example, audio information may be parameterized by applying a STFT Fourier Transform, Mel-Frequency Cepstral Coefficient analysis, a spectogram, a Fast Fourier Transform (FFT) or any other known or later developed method of parameterization.

Similarly, if the information is determined to be video information, the video information may be windowed by selecting individual frames of video, groups of frames which are averaged together or any other known or later developed method of windowing the video information without departing from the spirit or scope of this invention. In particular it should be noted that windowing of the information may be fixed or variable. Similarly, text information may be windowed and parameterized based on words, sentences, paragraphs, part of speech or any other known or later developed method or technique.

The windowed video information is then parameterized to generate coefficients by using color histograms. However, it will be apparent that decimated images derived from DC coefficients of compression blocks, Discrete Cosine Transforms or any other known or later developed parameterization method may be used without departing from the spirit or scope of this invention. Control then continues to step S30.

In step S30, the coefficients of the parameterized information are optionally reduced. The optional reduction of parameterized information coefficients preserves salient information about the original window or frame information. For example, truncation, principal component analysis, linear discriminant analysis, the methods discussed in Girgensohn et al. or any other known or later developed technique of analysis may be used in the practice of this invention. Control then continues to step S40.

The parameterized and optionally reduced information is stored into a two dimensional representation based on a similarity determination. The two dimensional representation may be a matrix, a linear representation or any other known or later developed dimensional representation. Control then continues to step S50.

In step S50, the similarity determination between each vector in the two dimensional representation is determined based on, for example, the Euclidean distance between the parameterized vectors in the parameterization space, the dot product of the vectors, the cosine of the angle between vectors, functions of vector statistics such as the Kullback-Leibler distance or any other known or later developed technique of determining similarity. Control then continues to step S60.

The similarity matrix values are determined for all frame combinations in step S60. Control then continues to step S70.

In step S70, a distance matrix is embedded into the similarity representation. For example, if a similarity matrix is used as the similarity representation, the value of D(i,j) reflects the relative similarity between the two vectors. Therefore the values D(i,j) where i=j reflect a maximum since a vector is most similar to itself along the diagonal. Control then continues to step S80.

The orthogonal matrix decomposition such as singular value decomposition, eigenvector analysis, Gaussian elimination, Gram-Schmidt or any other known or later developed decomposition of the similarity representation or similarity matrix is determined in step S80. For purposes of discussion, the singular value decomposition is described. However, it will be apparent that any technique of orthogonal matrix decomposition may be used in the practice of this invention. The singular value decomposition may be determined using any of the techniques and methods discussed above to create U/V matrices. Control continues to step S90.

In step S90, the major components in the information are determined based on the number of singular values which exceed a threshold value. The threshold value is used to differentiate major components from the information stream. Control continues to step S100.

The boundaries of the major components of the information are determined based on the singular vectors in step S100. Control continues to step S110.

In step S110, indicator vectors are determined based on the corresponding singular values. For example, each transition of the value of an indicator vector indicates the boundary between determined major components in the information stream. Control continues to step S120.

The number of major components is determined based on the number of singular values exceeding a threshold value in step S120. Control then continues to step S130 where the process ends.

Figure 4:
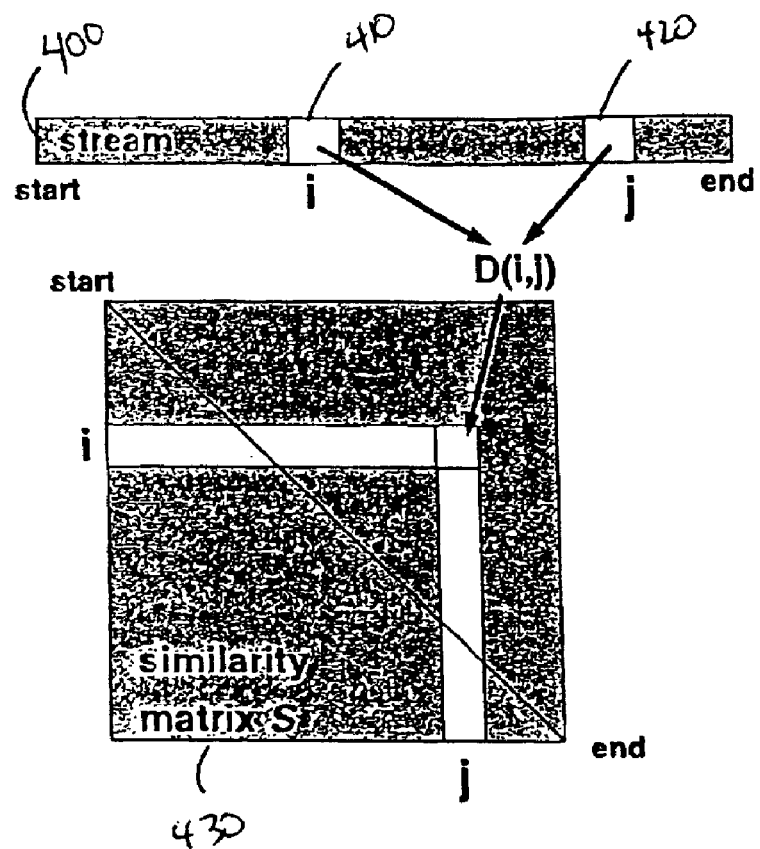
FIG. 4 shows a similarity matrix data structure according to a first exemplary embodiment of this invention.

FIG. 4 shows an exemplary similarity matrix data structure according to this invention. Information contained in information stream 400 is windowed and parameterized. For example, information stream 400 may be windowed and parameterized into parameter vectors i and j. The value of each parameter vector is optionally reduced or normalized so that similar values have a similar brightness. In various other exemplary embodiments according to this invention, a similarity matrix visualization may be used to determine the degree of similarity between portions of a ordered information stream by determining portions of light and dark in the determined similarity matrix.

FIG. 5 shows an exemplary similarity matrix 500 according to one embodiment of this invention. The similarity matrix 500 is based on exemplary information stream [7, 8, 8, 8, 9, 9, 8, 8]. The values of the exemplary similarity matrix 500 are determined based on exemplary similarity measure $S(i,j)=d(S_i,S_j)=2-|S_i-S_j|$. For example, the first row 510 of similarity matrix 500 is determined as follows:

$S(1,1)=2-|7-7|=2$ $S(1,2)=2-|8-7|=1$ $S(1,3)=2-|8-7|=1$ $S(1,4)=2-|8-7|=1$ $S(1,5)=2-|9-7|=0$ $S(1,6)=2-|9-7|=0$ $S(1,7)=2-|8-7|=1$ $S(1,8)=2-|8-7|=1$

In this way the first row 510 of similarity matrix 500 is determined. Successive rows of the similarity matrix 500 are similarly determined.

Figure 6:
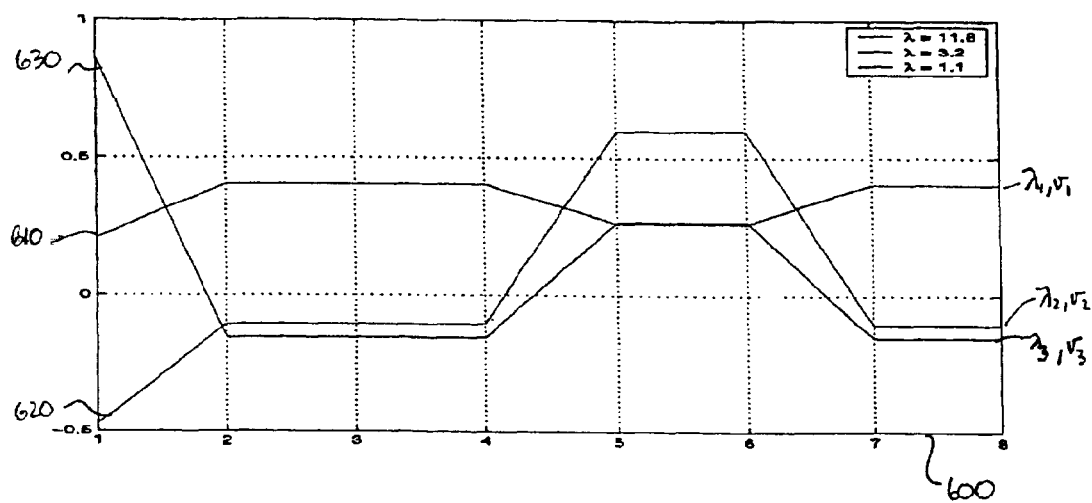
FIG. 6 is a graph of exemplary eigenvectors according to an exemplary embodiment of this invention.

FIG. 6 is a graph of exemplary eigenvector s according to this invention. The graph shows the eigenvectors of the similarity stream [7, 8, 8, 8, 9, 9, 8, 8]. The largest eigenvalues have weights of $\lambda_1=11.8, \lambda_2=3.1$ and $\lambda_3=1.1$, corresponding to the major components of the stream with values of 7, 8, 9. The three eigenvectors each of length 8 are then used to determine the structure of the similarity matrix and the distribution of the determined major components within the ordered information stream. Eigenvector $v_3$, element 630 is a maximum only at the first element. This corresponds exactly to the length-1 segment [7] which is the first element of the information stream, the shortest component and smallest non-zero eigenvalue. The next largest eigenvalue $\lambda_2$, corresponds to the components indicated by $v_2$, element 620 which is at a maximum at elements 5 and 6. This exactly corresponds to the segment [9,9] in the original sequence. The largest eigenvalue $\lambda_1$ corresponds to eigenvector $v_1$, element 610 associated with the longest component of the information stream, namely the two segments consisting of 8. As can be seen in the figure, $v_1$, element 610 is at a maximum at positions 2, 3, 5, and 7, 8 or exactly the locations of 8 in the original sequence. Thus, the number of principal eigenvalues indicate the number of component segments, and the corresponding eigenvector s indicate the segment.

In the various exemplary embodiments outlined above, the automatic segmentation and clustering system 100 can be implemented using a programmed general purpose computer. However, the automatic segmentation and clustering system 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3A–3B can be used to implement the automatic segmentation and clustering system 100.

Each of the circuits 102–124 of the automatic segmentation and clustering system 100 outlined above can be implemented as portions of a suitably programmed general purpose computer. Alternatively, circuits 102–124 of the automatic segmentation and clustering system 100 outlined above can be implemented as physically distinct hardware circuits within an ASIC, or using a FPGA, a PDL, a PLA or a PAL, or using discrete logic elements or discrete circuit elements. The particular form each of the circuits 102–124 of the automatic segmentation and clustering system 100 outlined above will take is a design choice and will be obvious and predicable to those skilled in the art.

Moreover, the automatic segmentation and clustering system 100 and/or each of the various circuits discussed above can each be implemented as software routines, managers or objects executing on a programmed general purpose computer, a special purpose computer, a microprocessor or the like. In this case, the automatic segmentation and clustering system 100 and/or each of the various circuits discussed above can each be implemented as one or more routines embedded in the communications network, as a resource residing on a server, or the like. The automatic segmentation and clustering system 100 and the various circuits discussed above can also be implemented by physically incorporating the automatic segmentation and clustering system 100 into a software and/or hardware system, such as the hardware and software systems of a web server.

As shown in FIG. 2, memory 104, matrix storage memory 110 and threshold value storage memory 116 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 210 shown in FIGS. 1–2 can each be any known or later developed device or system for connecting a communication device to the automatic segmentation and clustering system 100, including a direct cable connection, a connection over a wide area network or a local area network, a connection over an intranet, a connection over the Internet, or a connection over any other distributed processing network or system. In general, the communication link 210 can be any known or later developed connection system or structure usable to connect devices and facilitate communication Further, it should be appreciated that the communication link 210 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of segmenting and clustering ordered information comprising the steps of:

windowing the ordered information;

determining parameters from the windowed information;

storing the parameters into a two-dimensional representation;

determining a Similarity Matrix of vectors in the two-dimensional representation;

determining an orthogonal matrix decomposition of the Similarity Matrix based on at least one of, a singular value decomposition, eigenvector analysis, Gram-Schmidt and Gaussian elimination.

2. The method of claim 1, further comprising determining the number of major segments of the ordered information based on a function.

3. The method of claim 2, wherein the function is the number of singular values exceeding a threshold.

4. The method of claim 1, further comprising determining at least one ordered information segment boundary based on the determined singular vectors.

5. The method of claim 1, wherein:
the ordered information comprises an encoded information stream;
windowing the ordered information comprises reading window information from the encoded information stream; and
determining the parameters from the windowed information comprises reading the parameters from the encoded information stream.

6. A method of segmenting and clustering ordered video information comprising the steps of:
windowing the ordered video information;
determining parameters from the windowed information;
storing the parameters into a two-dimensional representation;
determining a Similarity Matrix of vectors in the two-dimensional representation;
determining an orthogonal matrix decomposition of the Similarity Matrix based on at least one of, singular value decomposition, eigenvector analysis, Gram-Schmidt and Gaussian elimination.

7. The method of claim 6, wherein determining the parameters is based on at least one of a histogram, orthonormal projections, deriving a decimated image from DC coefficients of compression macroblocks and discrete cosine transforms.

8. A method of segmenting and clustering ordered audio information comprising the steps of:
windowing the ordered audio information;
determining parameters from the windowed information;
storing the parameters into a two-dimensional representation;
determining a Similarity Matrix of vectors in the two-dimensional representation;
determining an orthogonal matrix decomposition of the Similarity Matrix based on at least one of, singular value decomposition, eigenvector analysis, Gram-Schmidt and Gaussian elimination.

9. The method of claim 8, wherein determining the parameters is based on at least one of a STFT Fourier Transform, a Mel-Frequency Cepstral Coefficients Analysis, a spectrogram, a Fast Fourier Transform and wavelet decomposition.

10. A method of segmenting and clustering ordered text information comprising the steps of:
windowing the ordered text information;
determining parameters from the windowed information;
storing the parameters into a two-dimensional representation;
determining a Similarity Matrix of vectors in the two-dimensional representation;
determining an orthogonal matrix decomposition of the Similarity Matrix based on at least one of, singular value decomposition, eigenvector analysis, Gram-Schmidt and Gaussian elimination.

11. The method of claim 10, wherein determining the parameters is based on at least one of a sentence, a paragraph, a meta-data information, a term-frequency inverse-document frequency information and part of speech information.

12. A system of segmenting and clustering ordered information comprising
a controller;
a windowing circuit for windowing the ordered information;
a parameterization circuit for determining parameters from windowed information;
a Similarity Matrix determining circuit for determining the similarity between two parameter vectors and storing the similarity information into a Similarity Matrix;
a orthogonal matrix decomposition circuit for determining a decomposition of the Similarity Matrix based on at least one of a singular value decomposition, eigenvector analysis, Gram-Schmidt and Gaussian elimination.

13. The system of claim 12, further comprising determining the number of major segments of the ordered information based on a function.

14. The system of claim 13, wherein the function is the number of singular values exceeding a threshold.

15. The system of claim 12, further comprising a component boundary determining circuit for determining at least one ordered information segment boundary based on the determined singular vectors.

16. A system of segmenting and clustering ordered video information comprising
a controller;
a windowing circuit for windowing the ordered video information;
a parameterization circuit for determining parameters from the windowed information;
a Similarity Matrix determining circuit for determining the similarity between two parameter vectors and storing the similarity information into a Similarity Matrix;
a orthogonal matrix decomposition circuit for determining a decomposition of the Similarity Matrix based on at least one of a singular value decomposition, eigenvector analysis, Gram-Schmidt and Gaussian elimination.

17. The system of claim 16, wherein determining the parameters is based on at least one of a histogram, orthonormal projections, deriving a decimated image from DC coefficients of compression macroblocks and discrete cosine transforms.

18. A system of segmenting and clustering ordered audio information comprising
a controller;
a windowing circuit for windowing the ordered audio information;
a parameterization circuit for determining parameters from the windowed information;
a Similarity Matrix determining circuit for determining the similarity between two parameter vectors and storing the similarity information into a Similarity Matrix;
a orthogonal matrix decomposition circuit for determining a decomposition of the Similarity Matrix based on at least one of a singular value decomposition, eigenvector analysis, Gram-Schmidt and Gaussian elimination.

19. The system of claim 18, wherein determining the parameters is based on at least one of a STFT Fourier Transform, a Mel-Frequency Cepstral Coefficients Analysis, a spectrogram, a Fast Fourier Transform and wavelet decomposition.

20. A system of segmenting and clustering ordered text information comprising
a controller
a windowing circuit for windowing ordered text information;
a parameterization circuit for determining parameters from the windowed information;

a Similarity Matrix determining circuit for determining the similarity between two parameter vectors and storing the similarity information into a Similarity Matrix;

a orthogonal matrix decomposition circuit for determining a decomposition of the Similarity Matrix based on at least one of a singular value decomposition, eigenvector analysis, Gram-Schmidt and Gaussian elimination.

21. The system of claim 20, wherein determining the parameters is based on at least one of a sentence, a paragraph, a meta-data information, a term-frequency inverse-document frequency information and part of speech information.

22. A computer readable storage mediums comprising:

computer readable program code embodied on said computer readable storage medium, said computer readable program code usable to program a computer to perform a method for segmenting and clustering ordered information comprising the steps of:

windowing the ordered information;

determining parameters from the windowed information;

storing the parameters into a two-dimensional representation;

determining a Similarity Matrix of vectors in the two-dimensional representation;

determining an orthogonal matrix decomposition of the Similarity Matrix based on at least one of, a singular value decomposition, eigenvector analysis, Gram-Schmidt and Gaussian elimination.

23. A carrier wave encoded to transmit a control program usable for a method for segmenting and clustering ordered information to a device for executing the control program, the control program comprising:

instructions for receiving windowing ordered information;

instructions for determining parameters from the windowed information;

instructions for storing the parameters into a two-dimensional representation;

instructions for determining a Similarity Matrix of vectors in the two-dimensional representation;

instructions for determining an orthogonal matrix decomposition of the Similarity Matrix based on at least one of, a singular value decomposition, eigenvector analysis, Gram-Schmidt and Gaussian elimination.

24. A method of segmenting and clustering ordered information comprising the steps of:

windowing at least two of audio ordered information, video ordered information and text ordered information;

determining parameters from the at least two windowed information;

storing the parameters into a single two-dimensional representation in which one of the dimensions corresponds to the ordering of the information;

determining a Similarity Matrix of vectors in the two-dimensional representation;

determining an orthogonal matrix decomposition of the Similarity Matrix based on at least one of, a singular value decomposition, eigenvector analysis, Gram-Schmidt and Gaussian elimination.

* * * * *